United States Patent [19]
Pollock

[11] 3,994,518
[45] Nov. 30, 1976

[54] SEAL HOLDING MEANS
[75] Inventor: James J. Pollock, Midland, Mich.
[73] Assignee: The Dow Chemical Company, Midland, Mich.
[22] Filed: Mar. 28, 1975
[21] Appl. No.: 563,039

[52] U.S. Cl. .................. 285/406; 285/DIG. 12; 403/229; 403/338; 339/75 P; 24/274 R
[51] Int. Cl.² .......................................... F16D 1/00
[58] Field of Search ............ 285/364, DIG. 12, 406, 285/283, 408, 367; 403/335, 338, 229; 24/274 R, 274 P, 274 WB; 339/75 P

[56] References Cited
UNITED STATES PATENTS

| | | | |
|---|---|---|---|
| 2,689,995 | 9/1954 | Smith | 285/410 X |
| 2,958,549 | 11/1960 | Spafford | 24/274 |
| 3,104,898 | 9/1963 | MacDonald et al. | 285/DIG. 12 |
| 3,233,922 | 2/1966 | Evans | 285/367 X |
| 3,458,219 | 7/1969 | Wesch | 285/364 X |
| 3,613,046 | 10/1971 | Kirk | 339/75 P |

FOREIGN PATENTS OR APPLICATIONS
834,853   5/1960   United Kingdom.......... 285/DIG. 12

Primary Examiner—Andrew V. Kundrat
Attorney, Agent, or Firm—Earl D. Ayers

[57] ABSTRACT

Means for clamping together two flanged ends of vitreous tubing or the like in which the facing surfaces of the flanged ends are flat wherein screw adjustable strap-like clamps having an array of screw engaging slots along their length are tightly coupled around each piece of tubing near the flanged end. With the flanged ends abutting, tension members, usually springs, are coupled between the clamps. Usually each tension member has at least one end coupled to that part of a clamp which lies between two screw engaging slots.

3 Claims, 2 Drawing Figures

SEAL HOLDING MEANS

BACKGROUND OF THE INVENTION

This invention relates to apparatus for clamping together the flanged ends of vitreous tubes, and particularly to such means for use in applications involving low internal pressure.

There are many applications in which flanged ends of glass members must be clamped together wherein the pressure on the joint is minimal.

A number of types of clamping means are available to couple such flanged ends, but all suffer from one or more of the following: they are expensive; they put strain on the flanged ends; they are adaptable for use with only one diameter of tubing or vessel; they require a specific type of flange, or they require close dimensional tolerances on the flanged parts with which they are used.

OBJECTS OF THE INVENTION

A principal object of this invention is to provide an improved means for joining together flanged ends of vitreous elements.

Another object of this invention is to provide an improved, more economical means for joining together flanged ends of vitreous elements.

A further object of this invention is to provide an improved, more versatile means for joining together flanged ends of vitreous elements.

STATEMENT OF INVENTION

In accordance with this invention a pair of flanged vitreous elements (tubes for example) having flat ends are joined together and held in place by a plurality of tension members spaced around the periphery of the flanges and engaging fastening elements on a pair of clamping members, one clamping member being secured around each vitreous element adjacent to its joined flanged end. Usually at least one resilient element is disposed between a clamp and the vitreous element it engages.

BRIEF DESCRIPTION OF THE DRAWING

The invention, as well as additional objects and advantages thereof, will best be understood when the following detailed description is read in connection with the accompanying drawing, in which.

DETAILED DESCRIPTION OF THE DRAWING

Figure 2:
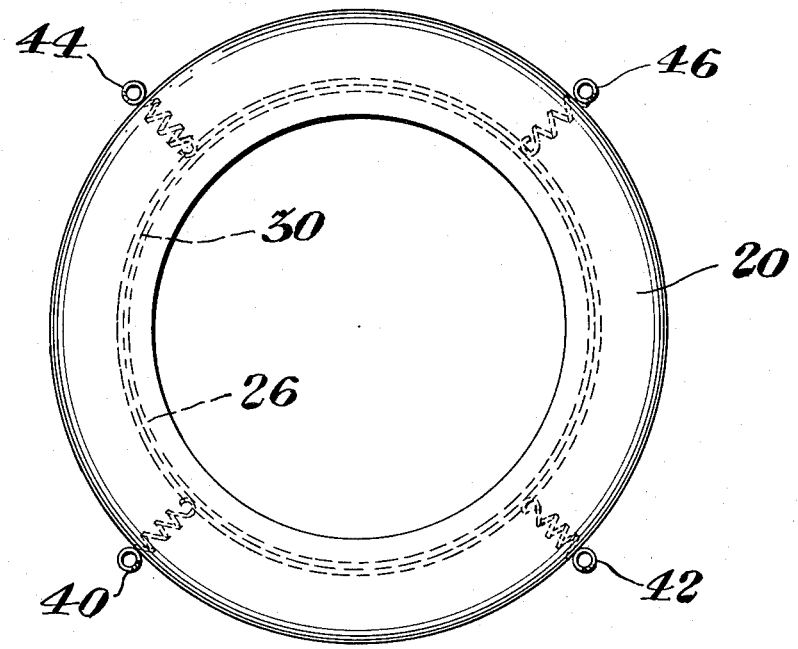
FIG. 2 is a sectional view, taken along the line 2—2 of FIG. 1.
Figure 1:
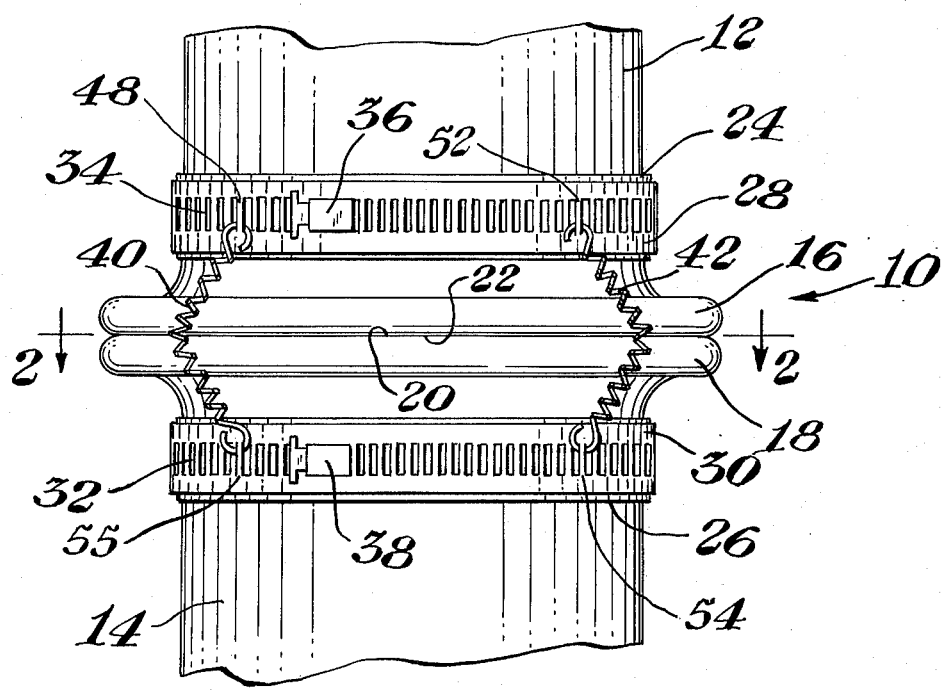
FIG. 1 is a side elevational view, partly broken away and in section, of apparatus in accordance with this invention.

Referring to FIGS. 1 and 2, there is shown sealing means, indicated generally by the numeral 10, coupling together a pair of tubular elements 12, 14 at their flanged ends 16, 18. The flanged ends 16, 18 have abutting flat surfaces 20, 22.

An adjustable strap clamping element 28, 30 is tightly secured around each tubular element 12, 14. Usually a resilient gasket layer 24, 26 lies between each clamp 28, 30 and the vitreous element 12, 14.

Each of the clamps has a series of tension member attaching means 48, 50, 52, 54, for example, whereby tension members 40, 42, 44, 46 are secured between the clamps 28, 30. The attaching means 48, 50, 52, 54 may be loops or hooks and either an integral or nonintegral part of the clamps.

Usually the clamps are of the screw tightening type wherein the adjusting screw parts 36, 38 engage slots 34, 32 in the strap part of each clamp. If such clamps are used, the attaching means 48, 50, 52, 54 is usually a bent out part of the clamp which lies between adjacent slots. If a hook type attaching means is required, the clamp wall between two slots may be broken and the wall part bent outwardly.

OPERATION

To join together the vitreous elements 12, 14 a clamp 28 or 30 is tightened around each element 12, 14 (usually over a gasket layer 24, 26) adjacent to the flanges 16 or 18.

The flat surfaces 20, 22 are then abutted together and the tension means 40, 42, 44, 46 attached.

While the spring elements will not hold the flanged parts together under any significant internal pressure, there are many applications wherein this clamping means is entirely adequate.

Because there is no clamping unit engaging the other (non-facing) surfaces of the flanges, the dimensional and shaping tolerances of such surfaces are unimportant, thereby allowing for the use of less expensive vitreous elements than if a clamp fitted around the flanges.

The use of adjustable strap clamps allows one to distribute the load evenly around the tubing or round part of the vitreous elements which are joined. Such clamps may be used for a wide variety of sizes of vitreous elements which are to be joined together, lessening parts inventory for clamping means. Although other tension means may be used, springs are economical and adjustable for use with many sizes of tubing or the like.

What is claimed is:

1. An assembly for joining together tubular flanged ends of vitreous elements, comprising a pair of tubular flanged ends, a pair of lengthwise screw adjustable strap-like clamps each having an array of screw engaging slots thereon, the wall space between some pairs of slots being bent outwardly to form integral tension element fastening means, one of said clamps being disposed tightly around the tubular part of each of said flanged elements, tension elements including ends, each tension element having one end attached to one of said tension element fastening means of the clamp on one vitreous element and the other end attached to one of said tension element fastening means of the clamp on the other vitreous element, said tension elements passing over said flanged ends.

2. An assembly in accordance with claim 1, wherein said tension elements are coil springs.

3. An assembly in accordance with claim 1, wherein a gasket is disposed between said clamps and the vitreous element around which it is disposed.

* * * * *